March 4, 1958 C. M. MIKKELSON 2,825,429
SEAL FOR AUTOMOTIVE VEHICLE BRAKE
Filed Oct. 22, 1954 2 Sheets-Sheet 1
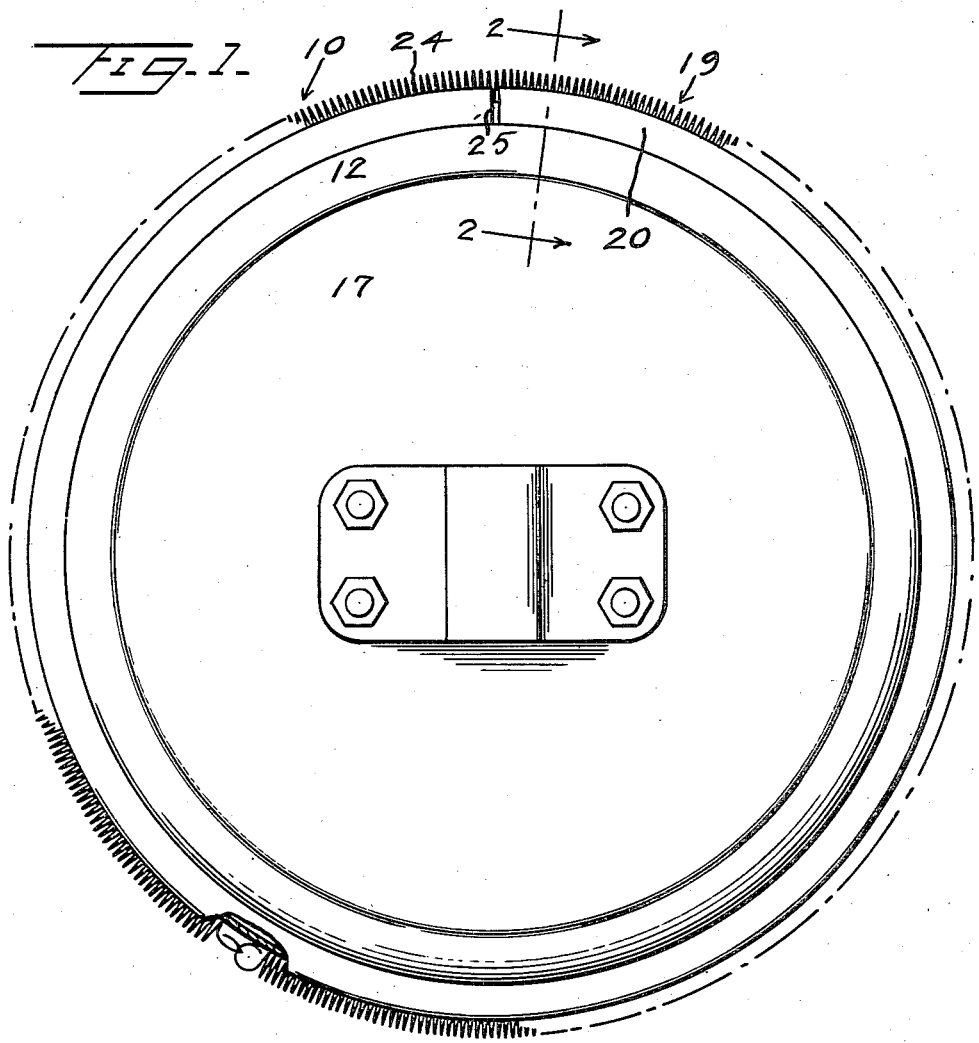
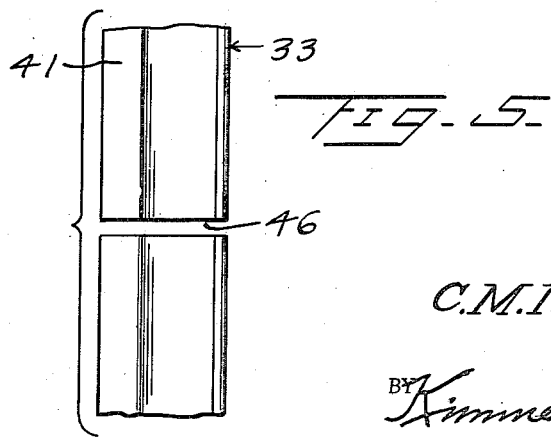
INVENTOR
C. M. Mikkelson
BY Kimmel & Crowell
ATTORNEYS March 4, 1958  C. M. MIKKELSON  2,825,429
SEAL FOR AUTOMOTIVE VEHICLE BRAKE
Filed Oct. 22, 1954  2 Sheets-Sheet 2
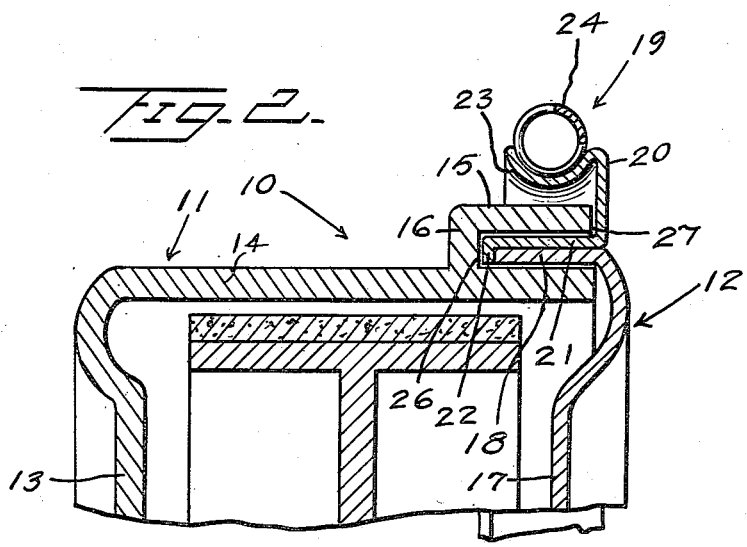
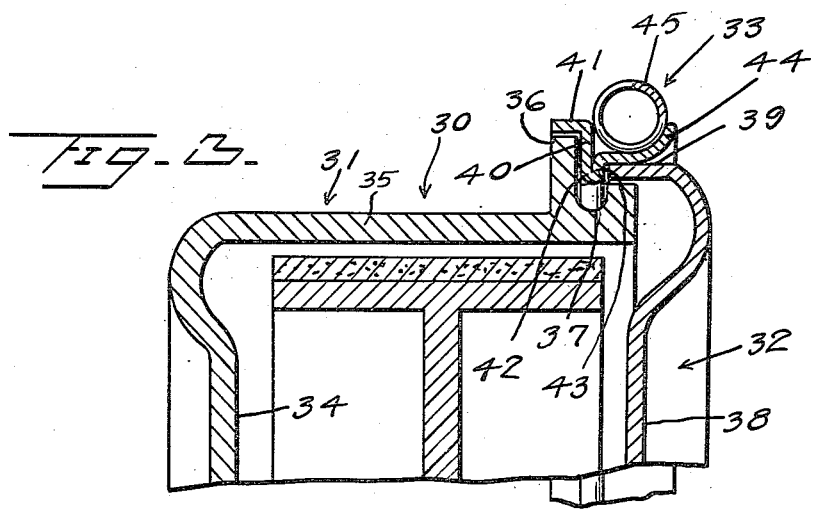
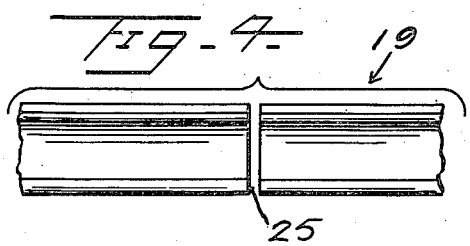
INVENTOR
C. M. Mikkelson
BY Kimmel & Crowell
ATTORNEYS

United States Patent Office 2,825,429
Patented Mar. 4, 1958

2,825,429

SEAL FOR AUTOMOTIVE VEHICLE BRAKE

Clarence M. Mikkelson, New Hampton, Iowa

Application October 22, 1954, Serial No. 464,090

1 Claim. (Cl. 188—218)

This invention relates to automotive vehicles brakes, and more specifically to brake drum assemblies of the internal expanding type. The invention is primarily directed to the provision of sealing means to effectively prevent dust, dirt, gravel, water, snow and other foreign material from entering the brake drum through the circumferential gap which inherently exists between the inner edge of the brake drum and its backing plate.

One of the primary objects of this invention is to provide a brake seal of the type described, the seal being mounted on the stationary back plate of the brake.

Another object of this invention is to provide a floating brake seal whereby the seal adjusts itself to disformities in either the brake drum, the back plate, or in both, whereby the seal automatically adjusts itself to effect an efficient seal at the deformed portions of the drum or plate.

A further object of this invention is to provide a seal of the type described which is adapted for incorporation in the conventional brakes now utilized in present day automotive vehicles, the seal being inexpensive to manufacture, non-complex in construction, and which requires no tools to install.

Other and further objects and advantages of the present invention will become more apparent from a consideration of the following specification when read in conjunction with the appended drawings, in which:

Figure 1 is a side elevation of a back cover plate of an automotive vehicle brake showing the application of a brake seal thereto constructed in accordance with this invention.

Figure 2 is an enlarged partial cross-sectional view taken on the line 2—2 of Figure 1, and looking in the direction of the arrows.

Figure 3 is an enlarged partial cross-sectional view illustrating a second embodiment of a brake seal adapted for use with another form of a conventional brake.

Figure 4 is a fragmentary top plan view of the seal illustrated in Figure 2.

Figure 5 is a fragmentary top plan view of the seal shown in Figure 3.

Referring now more specifically to the drawings reference numeral 10 designates, in general, a conventional brake casing for an automotive vehicle and includes a conventional brake drum 11 and a brake drum back cover plate 12.

The brake drum 11 is forged to form a substantially circular or hollow cylindrical member having opposed open and closed ends and which includes a circular front plate 13 having an integrally formed annular flange 14 projecting laterally from its circumference at one side thereof. The marginal edge portion of the free end of the flange 14 is surrounded and encircled in spaced relation by a concentrically formed circular band 15 integrally formed with the rib 16 which projects integrally and radially outwardly from the flange 14.

The brake drum cover plate 12 includes a substantially circular main body portion 17 having a circumferential flange 18 projecting laterally to one side thereof and adapted for insertion between the band 15 and the adjacent marginal end of the flange 14.

The cover plate 12 is stationary on the vehicle wheel axle and carries the brake seal 19 to which this invention relates.

The seal 19 is formed of metal and is bent in the configuration of a split ring. As shown in Figures 1 and 2 of the drawings, the seal 19 comprises a substantially U-shaped member having a normally upright bight 20 with an arm 21 superposed over and in surface-to surface contact with the flange 18. The outer end of the arm 21 terminates in an annular flange 22 and is adapted to lap over and engage against the free end of the flange 18.

The other arm 23 of the seal 19 is bent inwardly toward the arm 21 to provide an arcuately shaped channel in which is disposed an endless helicoidal spring 24 under tension.

As was stated above, the seal 19 is split at 25 whereby the adjacent free ends thereof are free to move toward and away from each other under varying temperature conditions, and the seal is maintained on the cover plate 12 intermediate of the circular band 15 and the adjacent side of the flange 14 to effectively seal the brake 10.

After the seal 19 has been installed in the position shown in Figure 2 (its normal working position) and the brake 10 assembled, the seal is moved laterally to the left to close the annular chamber 26 and the space 27 between the bight 20 and the outer end of the band 15.

As the brake drum 11 makes one rotation, any high spot on the outer end of the band 15 or on the outer end of the rib 16 will cause the seal 19 to float or move laterally to the right as viewed in Figure 2, and thereby assume its adjusted position. At the same time, rotation of the brake drum 11 sets up air currents by centrifugal action in the space 27 which acts to force dirt, water and other foreign materials away therefrom.

In the modification shown in Figures 3 and 5, the brake 30 includes a brake drum 31, a cover plate 32, and a seal 33.

The brake drum 31 comprises a circular front plate 34 having an integrally formed annular flange 35 provided with a radial rib 36 which projects away therefrom and is integrally formed therewith. Intermediate the outer end of the flange 35 and the rib 36, the flange 35 is provided with a circumferential groove 37.

The cover plate 32 comprises a circular main body portion 38 having a circumferential flange 39 projecting laterally to one side thereof, the flange 39 being positioned to encircle in spaced relation the outer marginal end of the flange 35 and to confront the rib 36.

The seal 33 comprises a split ring and is formed of metal and includes a normally vertically disposed member 40 adapted to have a side thereof adjacent the outer side of the rib 36, and is provided with a lateral extension 41 at one end thereof which surrounds in spaced relation the circumference of the rib 36.

The other end of the member 40 is reverted at 42 to form an arm 43 which is, in turn, bent laterally away from the member 40 to provide a channel shaped extension 44 having a substantially arcuate transverse cross-section, the extension 44 engaging against and encircling the flange 39.

An endless helicoidal spring 45, under tension, is positioned in the channel member 44 to anchor the seal 33 on the flange 39.

As was stated above, the seal is split at 46 (see Figure 5) to permit it to expand or contract under varying conditions of temperature.

The seal 33 is mounted on the cover plate 32 and is subsequently assembled with the brake drum 31 in the manner shown in Figure 3. Thereafter, the seal 33 is moved laterally to the left until the member 40 engages against the rib 36. Adjustment of the seal 33 is effected upon one rotation of the brake drum 31 whereby any high spots on the surface of the rib 36 which confronts the member 40 will cause a lateral shifting, to the right as seen in Figure 3, of the seal 33. This effects an automatic adjustment of the seal 33.

Rotation of the brake drum 31 will set up, under centrifugal action, air currents in the space between the circumference of the rib 36 and the adjacent side of the end 41 which acts to prevent any dirt or foreign matter from entering the brake 30.

Having described and illustrated two embodiments of this invention, it is to be understood that the same are offered merely by way of example, and that the invention is to be limited only by the scope of the following claim.

What is claimed is:

In combination with a brake having a brake drum and a cover plate therefor, said brake drum having a bifurcated outer end and said plate having a flange engaging in said bifurcated end in spaced relation to said drum, and a seal mounted on said plate, said seal having a radially inwardly extending flanged end thereof positioned for engaging the bight of the bifurcated end of said drum and engaging over an edge of said cover plate, and a second end positioned for engaging an end of one of the bifurcated arms, whereby either of said engagements causes a lateral shifting of said seal relative to said plate, and means mounted on said seal constantly tending to compress said seal around said plate.

References Cited in the file of this patent

UNITED STATES PATENTS

| | | |
|---|---|---|
| 1,938,905 | Hochmuth et al. | Dec. 12, 1933 |
| 1,965,137 | Cunnington | July 3, 1934 |
| 1,995,691 | Stough et al. | Mar. 26, 1935 |
| 2,263,079 | Flynn | Nov. 18, 1941 |

FOREIGN PATENTS

| | | |
|---|---|---|
| 740,628 | Germany | Oct. 25, 1943 |